(12) United States Patent
Konstandopoulos et al.

(10) Patent No.: US 7,867,944 B2
(45) Date of Patent: Jan. 11, 2011

(54) CATALYST SUPPORTING HONEYCOMB AND METHOD OF MANUFACTURING THE SAME

(75) Inventors: Athanasios G. Konstandopoulos, 45 Tselepi Street, Thessaloniki 54352 (GR); Kazushige Ohno, Ibi-gun (JP); Tomokazu Oya, Ibi-gun (JP); Kazutake Ogyu, Ibi-gun (JP)

(73) Assignees: Ibiden Co., Ltd., Ogaki-Shi (JP); Athanasios G. Konstandopoulos, Thessaloniki (GR)

( * ) Notice: Subject to any disclaimer, the term of this patent is extended or adjusted under 35 U.S.C. 154(b) by 0 days.

(21) Appl. No.: 12/104,296

(22) Filed: Apr. 16, 2008

(65) Prior Publication Data

US 2008/0261806 A1    Oct. 23, 2008

(30) Foreign Application Priority Data

Apr. 17, 2007    (WO) ................ PCT/JP2007/058376

(51) Int. Cl.
 *B01J 23/02*    (2006.01)
(52) U.S. Cl. .................................. 502/439; 502/527.19
(58) Field of Classification Search ................ 502/439, 502/527.19, 527.2, 527.21, 527.22, 527.24
See application file for complete search history.

(56) References Cited

U.S. PATENT DOCUMENTS

| | | | |
|---|---|---|---|
| 4,276,071 A * | 6/1981 | Outland ....................... | 55/523 |
| 5,569,633 A | 10/1996 | Carolan et al. | |
| 6,720,060 B1 * | 4/2004 | Swars .......................... | 428/116 |
| 6,843,822 B2 * | 1/2005 | Beall et al. ..................... | 55/523 |
| 6,939,824 B2 * | 9/2005 | Shimoda et al. .............. | 502/327 |
| 6,939,825 B1 | 9/2005 | Ohno et al. | |
| 7,037,567 B2 * | 5/2006 | Hashimoto et al. .......... | 428/116 |
| 7,056,365 B2 * | 6/2006 | Ichikawa et al. .............. | 55/523 |
| 7,119,046 B2 | 10/2006 | Ohno et al. | |
| 7,196,037 B2 | 3/2007 | Ohno et al. | |
| 7,250,385 B1 | 7/2007 | Ohno et al. | |
| 7,314,496 B2 | 1/2008 | Hong et al. | |
| 7,316,722 B2 | 1/2008 | Komori et al. | |
| 7,326,270 B2 | 2/2008 | Hong et al. | |
| 2004/0033175 A1 | 2/2004 | Ohno et al. | |
| 2004/0176246 A1 | 9/2004 | Shirk et al. | |
| 2005/0102987 A1 | 5/2005 | Kudo | |
| 2005/0169818 A1 | 8/2005 | Ohno et al. | |
| 2006/0019061 A1 | 1/2006 | Oshimi | |
| 2006/0032203 A1 | 2/2006 | Komori et al. | |
| 2006/0093784 A1 | 5/2006 | Komori et al. | |
| 2006/0159602 A1 | 7/2006 | Ohno et al. | |
| 2006/0188415 A1 | 8/2006 | Ohno et al. | |
| 2006/0194018 A1 | 8/2006 | Ohno et al. | |
| 2007/0020155 A1 * | 1/2007 | Ohno et al. .................. | 422/177 |
| 2007/0031722 A1 * | 2/2007 | Adzic et al. .................. | 429/44 |
| 2007/0204580 A1 * | 9/2007 | Kunieda ....................... | 55/523 |
| 2007/0227109 A1 | 10/2007 | Hong et al. | |
| 2008/0017572 A1 | 1/2008 | Kudo | |
| 2008/0086993 A1 | 4/2008 | Komori et al. | |
| 2008/0202087 A1 * | 8/2008 | Ohno et al. ................... | 55/524 |
| 2008/0254254 A1 * | 10/2008 | Ohno et al. ................. | 428/116 |
| 2008/0261806 A1 | 10/2008 | Konstandopoulos et al. | |

FOREIGN PATENT DOCUMENTS

| | | |
|---|---|---|
| EP | 1243335 | 9/2002 |
| EP | 1538133 | 6/2005 |
| FR | 2879236 | 6/2006 |
| JP | 2-144156 | 6/1990 |
| JP | 7-240115 | 9/1995 |
| JP | 8-332350 | 12/1996 |
| JP | 2003-170055 | 6/2003 |
| JP | 2005-118747 | 5/2005 |
| WO | WO 2005/121513 | 12/2005 |
| WO | WO 2007/010643 | 1/2007 |

OTHER PUBLICATIONS

Edited by Toray Research Center Technical Survey Division, "New development of nanoparticulates" Toray Research center, Aug. 1, 1999, pp. 63-64, Japan.

Kaoru Akiyama et al, Size Characteristics of Diesel Exhaust Particulates, Tokyo Metropolitan Research Institute Annual Report 2002, pp. 153-160 (w partial English translation).

\* cited by examiner

*Primary Examiner*—Timothy C Vanoy
*Assistant Examiner*—Michelle Hou
(74) *Attorney, Agent, or Firm*—Ditthavong Mori & Steiner, P.C.

(57) ABSTRACT

A catalyst supporting honeycomb includes a pillar-shaped honeycomb structure and catalyst particles supported on the honeycomb structure. The honeycomb structure includes cell walls extending in a longitudinal direction of the honeycomb structure to define a plurality of cells extending in the longitudinal direction. The plurality of cells include large-volume cells having first opening ends and second closing ends opposite to the first opening ends along the longitudinal direction, and small-volume cells having first closed ends and second opening ends opposite to the first closed ends along the longitudinal direction. Total cross sectional areas of the large-volume cells on a plane perpendicular to the longitudinal direction are larger than total cross sectional areas of the small-volume cells on the plane. The catalyst particles include an oxide catalyst having an average particle diameter of at least about 0.05 μm and at most about 1.00 μm.

6 Claims, 12 Drawing Sheets

A-A line cross-sectional view

CATALYST SUPPORTING HONEYCOMB AND METHOD OF MANUFACTURING THE SAME

CROSS-REFERENCE TO RELATED APPLICATIONS

The present application claims priority under 35 U.S.C. §119 to PCT Application No. PCT/JP2007/058376, filed on Apr. 17, 2007, the contents of which are incorporated herein by reference in their entirety.

BACKGROUND OF THE INVENTION

1. Field of the Invention

The present invention relates to a catalyst supporting honeycomb and a method of manufacturing the same.

2. Discussion of the Background

There has been known a catalyst supporting honeycomb which converts exhaust gases by allowing the exhaust gases to contact with a catalyst supported on cell walls of a honeycomb structure. With regard to a catalyst supporting honeycomb disclosed in WO2007/10643 A1, a catalyst is supported on a honeycomb structure by impregnating the honeycomb structure in a catalyst solution in a slurry state, and then heating the honeycomb structure.

The contents of WO 2007/10643 A1 are incorporated herein by reference in their entirety.

SUMMARY OF THE INVENTION

A catalyst supporting honeycomb according to one aspect of the present invention includes a honeycomb structure and catalyst particles supported on the pillar-shaped honeycomb structure. The honeycomb structure includes cell walls extending in a longitudinal direction of the honeycomb structure to define a plurality of cells extending in the longitudinal direction. The plurality of cells include large-volume cells having first opening ends and second closing ends opposite to the first opening ends along the longitudinal direction, and small-volume cells having first closed ends and second opening ends opposite to the first closed ends along the longitudinal direction. Total cross sectional areas of the large-volume cells on a plane perpendicular to the longitudinal direction are larger than total cross sectional areas of the small-volume cells on the plane. The catalyst particles include an oxide catalyst having an average particle diameter of at least about 0.05 μm and at most about 1.00 μm.

A catalyst supporting honeycomb according to another aspect of the present invention includes a pillar-shaped honeycomb structure including cell walls extending in a longitudinal direction of the honeycomb structure to define a plurality of cells extending in the longitudinal direction, and oxide catalyst particles provided on the cell walls. The plurality of cells include large-volume cells having first opening ends and second closing ends opposite to the first opening ends along the longitudinal direction, and small-volume cells having first closed ends and second opening ends opposite to the first closed ends along the longitudinal direction. Total cross sectional areas of the large-volume cells on a plane perpendicular to the longitudinal direction are larger than total cross sectional areas of the small-volume cells on the plane. Oxide catalyst particles are provided on the cell walls by introducing a gas containing a dispersed solution of a precursor of oxide catalyst into the honeycomb structure.

A method of manufacturing a catalyst supporting honeycomb according to further aspect of the invention includes manufacturing a honeycomb structure comprising cell walls extending in a longitudinal direction of the honeycomb structure to define a plurality of cells extending in the longitudinal direction. The plurality of cells include large-volume cells having first opening ends and second closing ends opposite to the first opening ends along the longitudinal direction, and small-volume cells having first closed ends and second opening ends opposite to the first closed ends along the longitudinal direction. Total cross sectional areas of the large-volume cells on a plane perpendicular to the longitudinal direction are larger than total cross sectional areas of the small-volume cells on the plane. In the method, a solution of a precursor of a catalyst is dispersed in a gas, the gas containing the dispersed solution of the precursor of the catalyst is introduced into said honeycomb structure, and the honeycomb structure is heated so that the precursor of the catalyst is formed into catalyst particles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
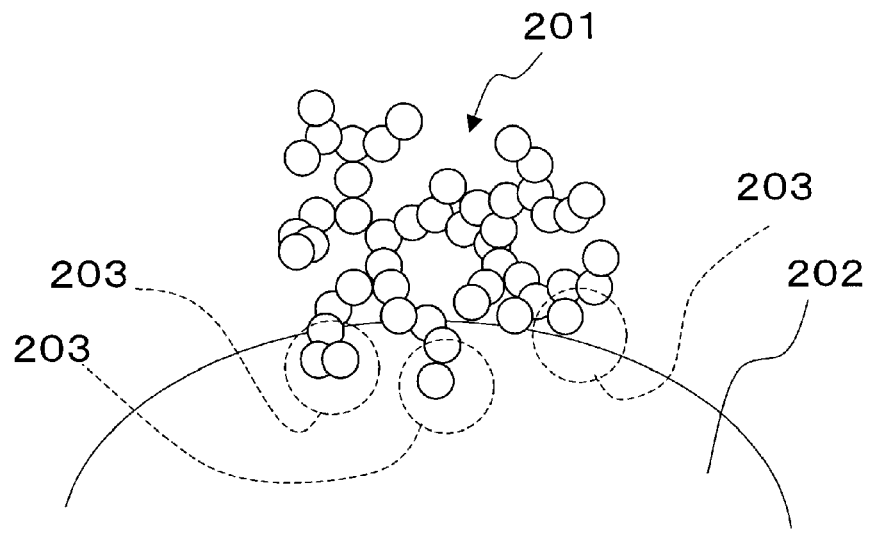
FIG. 1A shows a state of catalysts supported by a conventional method and soot.

The embodiments will now be described with reference to the accompanying drawings, wherein like reference numerals designate corresponding or identical elements throughout the various drawings.

In the catalyst supporting honeycomb according to the embodiments of the present invention, oxide catalyst particles are supported on a pillar-shaped honeycomb structure in which a plurality of cells are formed in parallel with one another in a longitudinal direction with a cell wall interposed therebetween, the plurality of cells including a set of large-volume cells in which either end of each of the cells is sealed, and a set of small-volume cells in which the other end of each of the cells is sealed, the total area of the set of large-volume cells in the cross section perpendicular to the longitudinal direction being larger than the total area of the set of small-volume cells in the cross section perpendicular to the longitudinal direction. Further, the average particle diameter of the oxide catalyst particles is set to at least about 0.05 µm and at most about 1.00 µm.

Figure 1B:
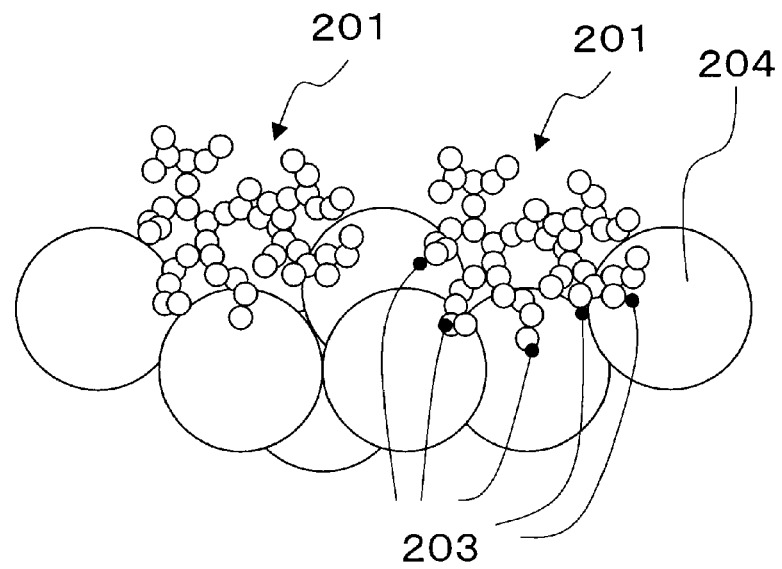
FIG. 1B shows a state of the catalysts according to an embodiment of the present invention and soot.

Thus, the average particle diameter of the oxide catalyst particles supported on the honeycomb structure is set to at least about 0.05 µm and at most about 1.00 µm, which is almost the same as an average particle diameter of the soot aggregate particles. Therefore, the contact points between the soot aggregate particles and the catalyst particles may be increased more easily as shown in FIG. 1B. In other words, the soot and the catalyst can easily contact with each other, with the result that the soot combustion behavior by active oxygen provided by the oxide catalyst tends to be improved.

This behavior, in addition to the forced regeneration of soot flowed into the catalyst supporting honeycomb, makes it easier to combust soot as compared to the catalyst supporting honeycomb of WO2007/10643 A1. Further, the soot and the catalyst may more easily contact with each other, by making the set of cells on the exhaust gas inlet side larger than the set of cells on the exhaust gas outlet side to enlarge the area of cell walls on which soot is to be accumulated per unit volume of the catalyst supporting honeycomb.

As a result, it may be easier to keep the amount of soot that accumulates with time on cell walls small.

Particularly, it may be easier to sufficiently enlarge the area of cell walls on which soot is to be accumulated per unit volume of the catalyst supporting honeycomb when, in the cross section perpendicular to the longitudinal direction, a cell in the set of large-volume cells is an octagon and a cell in the set of small-volume cells is a quadrangle, as the catalyst supporting honeycomb according to the embodiments of the present invention.

Moreover, the honeycomb structure may include a ceramic sintered body as the catalyst supporting honeycomb according to the embodiments of the present invention. Further, it is possible to form a honeycomb structure that is superior in heat resistance, when the honeycomb structure includes a silicon carbide sintered body as the catalyst supporting honeycomb according to the embodiments of the present invention. Including a silicon carbide also tends to make the honeycomb structure superior in mechanical characteristics and high in thermal conductivity. Furthermore, the honeycomb structure may include a plurality of honeycomb units bound together as the catalyst supporting honeycomb according to the embodiments of the present invention.

Further, when the oxide catalyst includes at least one of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $AnB1-nCO_3$, in which A represents La, Nd, Sm, Eu, Gd or Y, B represents an alkali metal or an alkali earth metal, and C represents Mn, Co, Fe or Ni, as the catalyst supporting honeycomb according to the embodiments of the present invention, a catalyst which is excellent in active oxygen delivery performance can be supported on the catalyst supporting honeycomb. As a result of this, the soot combustion function of the catalyst supporting honeycomb tends to be especially improved.

Furthermore, when a gas containing a dispersed solution of a precursor of an oxide catalyst is flowed into a pillar-shaped honeycomb structure configured by a plurality of cells formed in parallel with one another in a longitudinal direction with a cell wall interposed therebetween, the plurality of cells including a set of large-volume cells in which either end of each of the cells is sealed, and a set of small-volume cells in which the other end of each of the cells is sealed, and the total area of the set of large-volume cells in the cross section perpendicular to the longitudinal direction being larger than the total area of the set of small-volume cells in the cross section perpendicular to the longitudinal direction as the catalyst supporting honeycomb according to the embodiments of the present invention, the catalyst supporting honeycomb, in which the oxide catalyst particles are supported on the cell walls, can show the same effects as those specifically described above as the effects of the catalyst supporting honeycombs according to the catalyst supporting honeycombs according to the embodiments of the present invention.

Moreover, as a method of manufacturing a catalyst supporting honeycomb according to the embodiments of the present invention, according to the method of manufacturing the catalyst supporting honeycomb which includes: manufacturing a honeycomb structure configured by a plurality of cells formed in parallel with one another in a longitudinal direction with a cell wall interposed therebetween, the plurality of cells including a set of large-volume cells in which either end of each of the cells is sealed, and a set of small-volume cells in which the other end of each of the cells is sealed, and the total area of the set of large-volume cells in the cross section perpendicular to the longitudinal direction being larger than the total area of the set of small-volume cells in the cross section perpendicular to the longitudinal direction; dispersing a solution of a precursor of a catalyst in a gas; flowing a gas containing the dispersed solution of the precursor of the catalyst into the honeycomb structure; and heating the honeycomb structure so that the precursor of the catalyst is formed into catalyst particles. According to the above-mentioned method of manufacturing the catalyst supporting honeycomb, it is possible to manufacture the catalyst supporting honeycomb which can show the same effects as those specifically described above as the effects of the catalyst supporting honeycombs according to the catalyst supporting honeycomb according to the embodiments of the present invention.

Normally, the average diameter of soot aggregate particles in exhaust gases is about 0.1 µm. However, in the catalyst supporting honeycomb disclosed in WO2007/10643 A1, since the honeycomb structure has been impregnated in the catalyst solution in a slurry state, the diameter of the supported catalyst particles 202 tends to be much larger than the diameter of the soot aggregate particles 201 of soot as shown in FIG. 1A. Accordingly, this prior art has a problem that, since fewer contact points 203 tends to be present between the catalyst particles and the soot aggregate particles, soot combustion behavior by active oxygen provided by an oxide catalyst cannot be fully exerted.

Accordingly, soot captured by the catalyst supporting honeycomb tends to be difficult to be oxidized, except for by forced regeneration using high temperature exhaust gases. Therefore, soot is easily accumulated on cell walls, causing a problem of lowering fuel economy due to frequent forced regeneration.

In an embodiment of the present invention, it may be easier to keep the amount of soot that accumulates with time on cell walls small in catalyst supporting honeycombs in which a catalyst is supported, by allowing soot that has been deposited on and in the cell walls to more easily establish good contact with the catalyst with each other so as to improve the soot combustion behavior by active oxygen provided by the oxide catalyst.

In the following, a plurality of embodiments of the present invention are described with reference to drawings.

First Embodiment

The following description will discuss a honeycomb structure including a ceramic sintered body according to a first embodiment of the present invention with reference to drawings.

Figure 2:
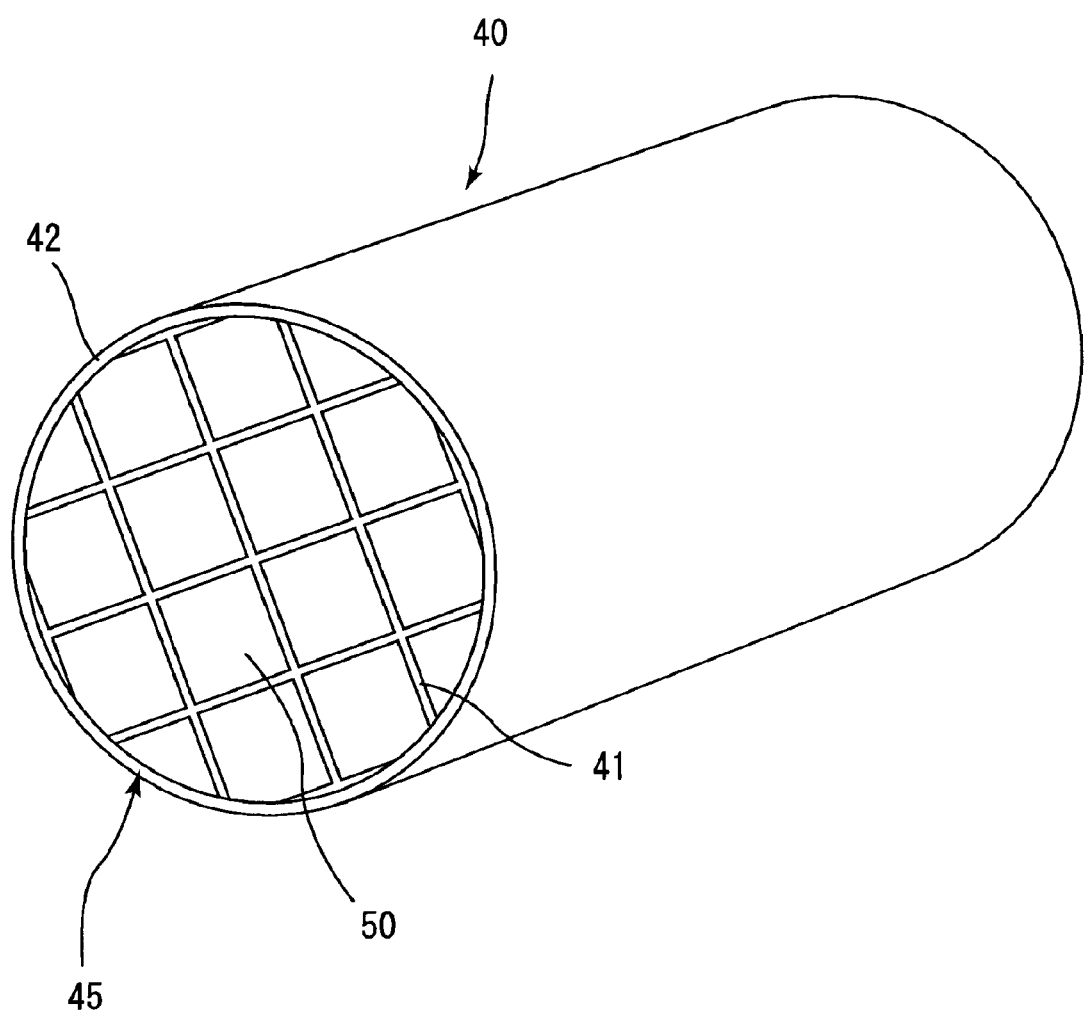
FIG. 2 is a perspective view that schematically shows one example of the catalyst supporting honeycomb of the first embodiment of the present invention.
Figure 3A:
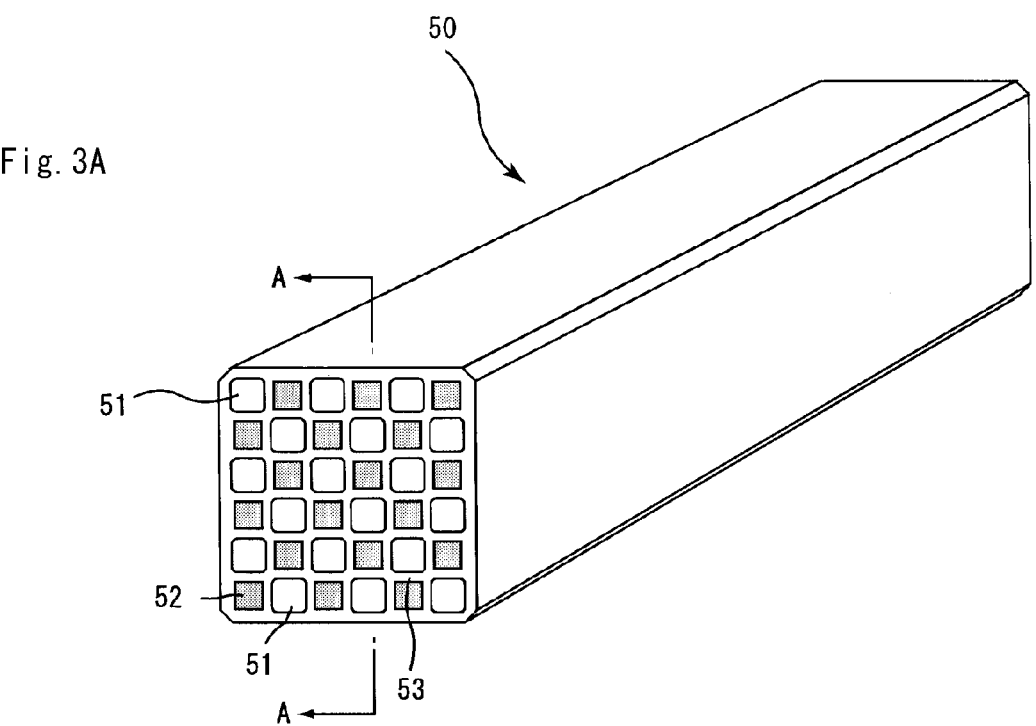
FIG. 3A is a perspective view of a honeycomb unit that constitutes the catalyst supporting honeycomb shown in FIG. 2.

FIG. 2 is a perspective view that schematically shows one example of the catalyst supporting honeycomb of the first embodiment of the present invention. FIG. 3A is a perspective view of a honeycomb unit that constitutes the catalyst supporting honeycomb shown in FIG. 2, and FIG. 3B is an A-A line cross-sectional view of the honeycomb unit shown in FIG. 3A.

The catalyst supporting honeycomb shown in FIG. 2 includes a plurality of honeycomb units bound together. However, a honeycomb structure of the present embodiment may include one honeycomb unit as described later.

In a honeycomb structure 45, a plurality of honeycomb units including silicon carbide sintered body and the like are combined with one another by interposing a sealing material layer (adhesive layer) 41 to form a round pillar-shaped ceramic block, and a sealing material layer (coat layer) 42 is further formed on the periphery of this ceramic block. Then, the oxide catalyst particles (not shown) are supported on the honeycomb structure 45 to obtain a catalyst supporting honeycomb 40.

Figure 3B:
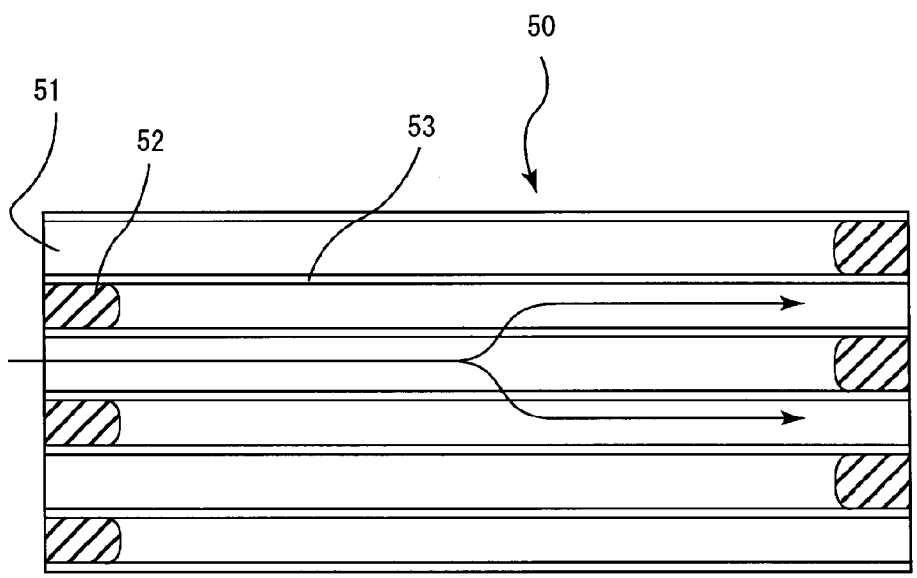
FIG. 3B is an A-A line cross-sectional view of the honeycomb unit shown in FIG. 3A.

In the honeycomb unit 50, a large number of cells 51 are longitudinally disposed in parallel with one another as shown in FIGS. 3A and 3B, and a cell wall (wall portion) 53 separating the cells 51 functions as a filter. Namely, either end on the exhaust gas inlet side or the exhaust gas outlet side of each of the cells 51 disposed in the honeycomb unit 50 is sealed with a plug 52, and exhaust gases having flowed into one of the cells 51 surely passes through the cell wall 53 that separates the cells 51, and flows out from another cell 51.

Further, with respect to the shape of the cells, a cell in the set of large-volume cells in the cross section perpendicular to the longitudinal direction is an octagon, and a cell in the set of small-volume cells in the cross section perpendicular to the longitudinal direction is a quadrangle.

Moreover, the oxide catalyst particles having the average particle diameter of at least about 0.05 μm and at most about 1.00 μm are supported on the honeycomb unit 50.

Examples of other shapes of the cells include the following. FIGS. 4A to 4D and FIGS. 5A to 5F are cross-sectional diagrams that schematically show part of the cross section of a honeycomb unit 50 configuring the catalyst supporting honeycomb 40 according to the embodiment of the present invention.

Figure 4A:
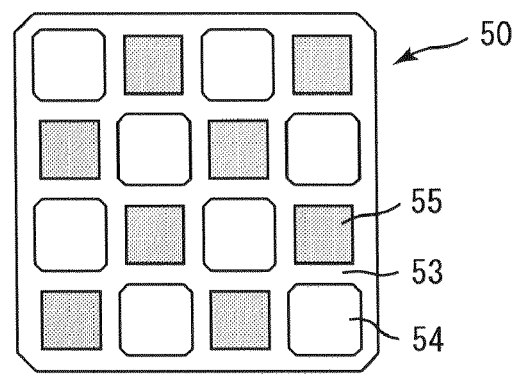
FIGS. 4A to 4D are diagrams of a cross section perpendicular to the longitudinal direction of a cell in a catalyst supporting honeycomb unit according to an embodiment of the present invention.
Figure 4B:
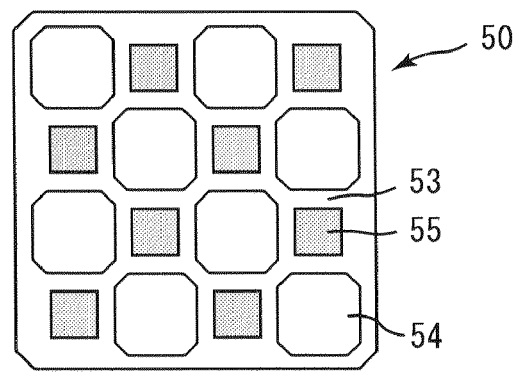
Figure 4C:
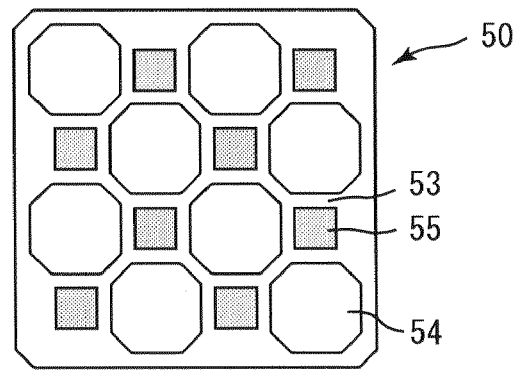
Figure 4D:
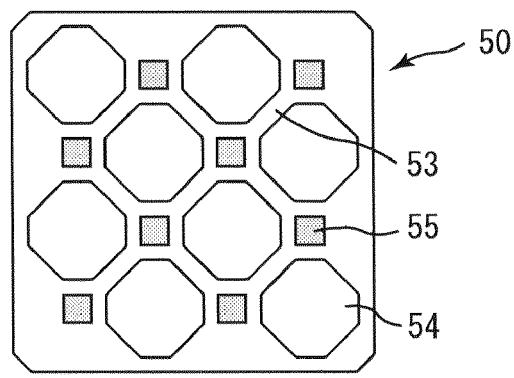

The aperture ratio (opening ratio) is almost 1.55 in FIG. 4A, almost 2.54 in FIG. 4B, almost 4.45 in FIG. 4C, and almost 6.00 in FIG. 4D. Also, the aperture ratios are all almost 4.45 in FIGS. 5A, 5C, and 5E, and the aperture ratios are all almost 6.00 in FIGS. 5B, 5D, and 5F. In FIG. 6, the aperture ratio is almost 3.00.

In FIGS. 4A to 4D, each of the cross-sectional shapes of the large-volume cells 54 is an octagon and each of the cross-sectional shapes of the small-volume cells 55 is a quadrangle (square), and these are alternately arranged; thus, by changing the cross-sectional area of each of the small-volume cells 55, with the cross-sectional shape of each of the large-volume cells 54 being slightly changed, it is possible to desirably change the aperture ratio easily. In the same manner, with respect to the honeycomb structure shown in FIGS. 5A to 5F and FIG. 6, the aperture ratio can be desirably changed.

Figure 5A:
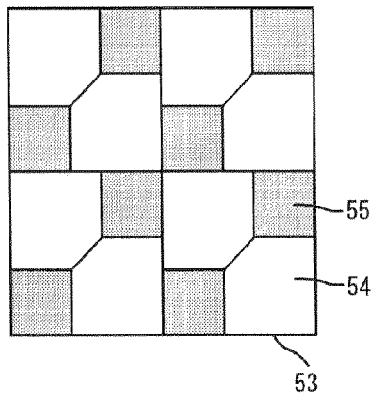
FIGS. 5A to 5F are diagrams of a cross section perpendicular to the longitudinal direction of a cell in a catalyst supporting honeycomb unit according to an embodiment of the present invention.
Figure 5B:
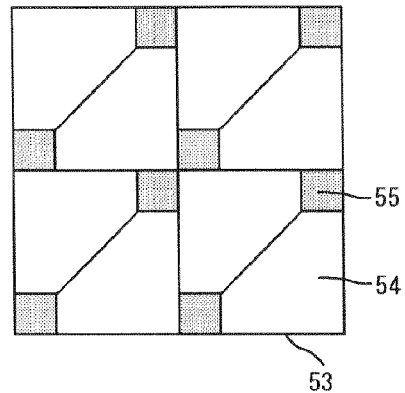
Figure 5C:
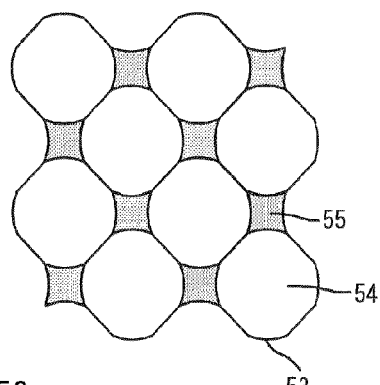
Figure 5D:
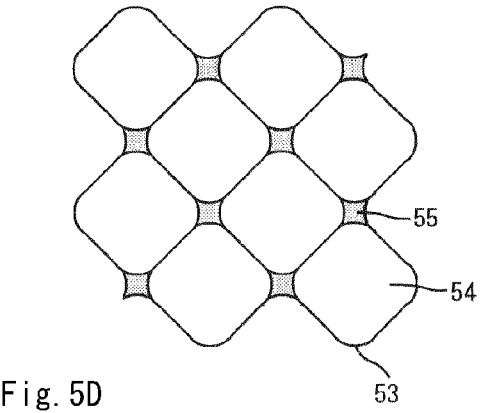
Figure 6:
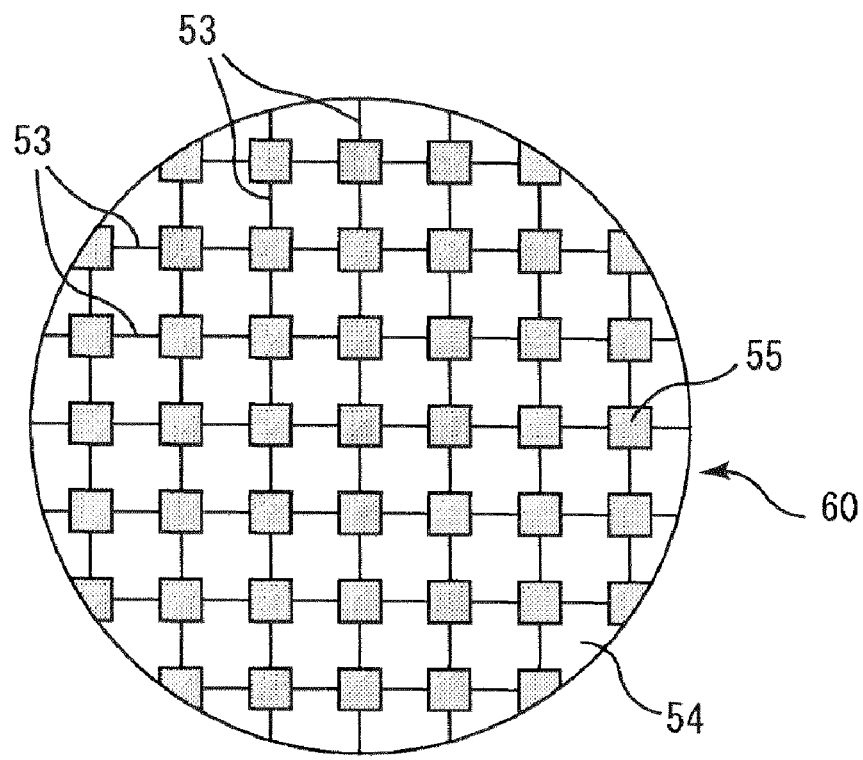
FIG. 6 is a view that shows an exemplary integral catalyst supporting honeycomb according to an embodiment of the present invention.

Here, in honeycomb units shown in FIGS. 5A and 5B, each of the cross-sectional shapes of the large-volume cells 54 is a pentagon with three corners thereof being set to almost right angles; and each of the cross-sectional shapes of the small-volume cells 55 is a quadrangle, and the respective quadrangles are placed at portions diagonally facing each other within a greater quadrangle. Honeycomb units shown in FIGS. 5C and 5D have modified shapes of the cross-sections shown in FIGS. 4A to 4D so that a portion of the cell wall, which is commonly possessed by each of the large-volume cells 54 and each of the small-volume cells 55, is expanded toward the small-volume cells with a certain curvature. This curvature may be desirably set. In this case, the curved line, which forms the cell wall commonly possessed by each of the large-volume cells 54 and each of the small-volume cells 55, corresponds to a quarter of a circle.

Figure 5E:
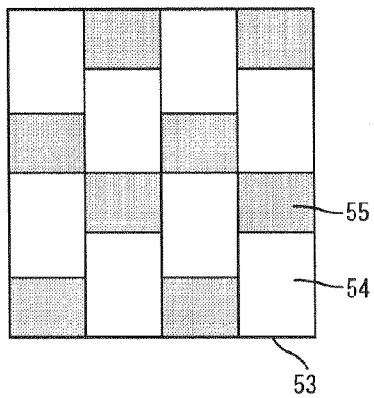
Figure 5F:
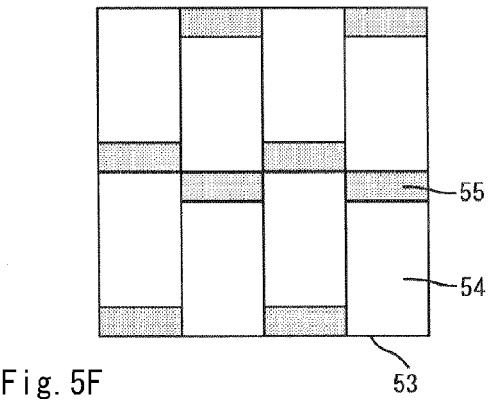

In the honeycomb units shown in FIGS. 5E and 5F, the cross-sectional shapes of the large-volume cells 54 and the small-volume cells 55 are quadrangular (rectangular), and as shown in the Figures, the cross-sectional shapes of two large-volume cells 54 and two small-volume cells 55 are arranged to form almost a square when combined with one another.

In the present embodiment, the distance between centers of gravity of cross sections perpendicular to the longitudinal direction of adjacently located large-volume cells 54 is desirably designed to be equal to the distance between centers of gravity of cross sections perpendicular to the longitudinal direction of adjacently located small-volume cells 55.

Further, in the honeycomb structure, the shape of the cells (large-volume cells 54 and small-volume cells 55) in the cross sections perpendicular to the longitudinal direction is desirably a polygonal shape, and more desirably a quadrangle and an octagon.

The polygonal shape is likely to exert either of the following effects; this polygonal shape eliminates portions of cells that cause greater friction due to the shape of the cells when exhaust gases pass through the large-volume cells 54 and the small-volume cells 55, so as to reduce a pressure loss caused by the friction of exhaust gases upon passing through the cell, or eliminates portions of a cell wall with irregular thickness, that is, portions that locally make it difficult for exhaust gases to pass through, so as to reduce a pressure loss caused by resistance of a cell wall exerted when exhaust gases pass through the cell wall.

Moreover, among polygonal shapes, a polygonal shape of a quadrangle or more is desirably used, and at least one of the corners is desirably formed as an obtuse angle. With this arrangement, it may be easier to reduce a pressure loss caused by friction of exhaust gases upon flowing through the cell on the gas inlet side and friction of exhaust gases upon flowing through the cell on the gas outlet side.

Further, in the present embodiment, in the cross section perpendicular to the longitudinal direction, at least one of angles formed by crossing of the cell wall commonly possessed by a large-volume cell 54 and the adjacent large-volume cell 54, and the cell wall commonly possessed by a large-volume cell 54 and a small-volume cell 55, is desirably an obtuse angle.

The vicinity of each of corners in the cross sections of at least one of the large-volume cells 54 and the small-volume cells 55 is desirably formed by a curved line, as shown in FIGS. 5C and 5D, for example. This is because it may be easier to prevent occurrence of cracks that are caused by a stress concentrating on corners of the cells.

In the present embodiment, the ratio of the areas between the set of large-volume cells and the set of small-volume cells in the cross section ("set of large-volume cells"/"set of small-volume cells") is desirably at least about 1.01 and at most about 6.0.

When the above-mentioned ratio of the areas ("set of large-volume cells"/"set of small-volume cells") is about 6.0 or less, the capacity of the set of small-volume cells does not become too small; thus, the pressure loss, which is caused by the friction of exhaust gases upon passing through the cell on the gas outlet side and resistance exerted on exhaust gases upon passing through the cell wall, tends not to increase and thus the initial pressure loss tends not to increase. The ratio of the areas ("set of large-volume cells"/"set of small-volume cells") is desirably at least about 1.2 and at most about 5.0. More desirably, the ratio of the areas ("set of large-volume cells"/"set of small-volume cells") is in the range of about 1.2 to about 3.0.

Also in the present embodiment, the ratio of the areas of the large-volume cell 54 and the small-volume cell 55 in the cross section ("large-volume cells"/"small-volume cells") is desirably at least about 1.01 and at most about 6.0. The ratio of the areas ("large-volume cell"/"small-volume cell") is referred to as an aperture ratio.

When the aperture ratio is about 6.0 or less, the capacity of the small-volume cell 55 does not become too small; thus, the pressure loss, which is caused by friction of exhaust gases upon passing through the cell on the gas outlet side and resistance exerted on exhaust gases upon passing through the cell wall, tends not to increase and thus the initial pressure loss tends not to increase. The aperture ratio is desirably at least about 1.2 and at most about 5.0. More desirably, the aperture ratio is in the range of about 1.2 to about 3.0.

The honeycomb structure 45 includes a porous ceramic, and examples of the materials thereof include: a nitride ceramic such as aluminum nitride, silicon nitride and boron nitride; a carbide ceramic such as silicon carbide and zirconium carbide; and an oxide ceramic such as cordierite, alumina, silica and aluminum titanate, and the like. Moreover, the honeycomb structure 45 may be made of two or more kinds of materials such as a composite material of silicon and silicon carbide. In the case of using a composite material of silicon and silicon carbide, silicon is desirably added thereto to make up at least about 5% by weight and at most about 45% by weight of the entire body.

With respect to the porous ceramic material, a silicon carbide-based ceramic is desirably used, since this material does not melt in the regeneration process due to its superior heat resistance, and is also superior in mechanical characteristics and has a high thermal conductivity. Here, the silicon carbide-based ceramic refers to a material having a silicon carbide content of about 60% by weight or more. In the honeycomb structure 45, the sealing material layer (adhesive layer) 41, which is formed between the honeycomb units 50, also functions as an adhesive material for binding a plurality of honeycomb units 50 to one another. In contrast, the sealing material layer (coat layer) 42, which is formed on the peripheral face of the ceramic block, is also allowed to function as a sealing material used for preventing exhaust gases passing through the cells from leaking from the peripheral face of the honeycomb structure 45 when the honeycomb structure 45 is placed in an exhaust passage of an internal combustion engine, and also to function as an reinforcing member for adjusting the shape of the honeycomb structure 45.

Here, in the honeycomb structure 45, the adhesive layer 41 and the coat layer 42 may be formed by using the same material, or may be formed by using different materials. In the case where the adhesive layer 41 and the coat layer 42 are made from the same material, the blending ratio of materials thereof may be the same or different. Moreover, the material may have either a dense structure or a porous structure. Examples of the material used for forming the adhesive layer 41 and the coat layer 42 include, although not particularly limited, a material including at least one of inorganic fibers and inorganic particles in addition to an inorganic binder and an organic binder, may be used.

Examples of the above-mentioned inorganic binder include silica sol, alumina sol and the like. Each of these materials may be used alone, or two or more kinds of these may be used in combination. Among the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is more desirably used.

Examples of the inorganic fibers include a ceramic fiber such as silica-alumina, mullite, alumina and silica, and the like. Each of these may be used alone, or two or more kinds of these may be used in combination. Among the above-mentioned inorganic fibers, silica-alumina fibers are more desirably used.

Examples of the inorganic particles include carbides, nitrides and the like, and more specifically include inorganic powder and the like made of silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Next, the embodiments of the method of manufacturing the honeycomb structure are described.

First, by using a raw material paste mainly composed of the ceramic described above, extrusion molding is carried out to manufacture a quadrangular (square-pillar) shaped ceramic molded body.

Although the particle diameter of the ceramic powder is not particularly limited, the ceramic powder that tends not to cause the case where the size of the honeycomb unit manufactured by the following firing treatment becomes smaller than that of the ceramic molded body after degreased is desirable. For example, ceramic powder prepared by combining 100 parts by weight of powder having an average particle diameter of at least about 0.3 μm and at most about 70 μm with at least about 5 parts by weight and at most about 65 parts by weight of powder having an average particle diameter of at least about 0.1 μm and at most about 1.0 μm, is desirably used.

Binder and dispersant solution may be blended in the above-mentioned raw material. Examples of the above-mentioned binder include: methyl cellulose, carboxymethyl cellulose, hydroxyethyl cellulose, polyethylene glycol and the like, although not particularly limited thereto.

In general, the compounding amount of the above-mentioned binder is desirably at least about 1 part by weight and at most about 15 parts by weight with respect to 100 parts by weight of ceramic powder.

Examples of the dispersant solution include: an organic solvent such as benzene; alcohol such as methanol; water and the like, although not particularly limited thereto.

The ceramic powder, binder and dispersant solution are mixed by an attritor or the like, sufficiently kneaded by a kneader or the like so that a raw material paste is obtained, and then the obtained raw material paste is extrusion molded.

Moreover, a molding auxiliary may be added to the raw material paste, if necessary. Examples of the molding auxiliary include ethylene glycol, dextrin, fatty acid, fatty acid soap, polyvinyl alcohol, water and the like, although not particularly limited thereto.

Furthermore, a pore-forming agent, such as balloons that are fine hollow spheres including an oxide-based ceramic, spherical acrylic particles, and graphite may be added to the raw material paste, if necessary.

With respect to the balloons, not particularly limited, for example, alumina balloons, glass micro-balloons, shirasu balloons, fly ash balloons (FA balloons), mullite balloons and the like may be used. Among these, alumina balloons are more desirably used.

Next, the above-mentioned ceramic molded body is dried by using a micro-wave dryer, a hot-air dryer, a dielectric dryer, a decompression dryer, a vacuum dryer, a freeze dryer or the like to form a ceramic dried body. Next, a predetermined amount of plug material paste, which forms plugs, is injected into ends on the side of either set of cells and into the ends on the other side of the other set of cells, so as to seal the cells.

The plug material paste is not particularly limited, and for example, the same paste as the raw material paste used for manufacturing a ceramic molded body may be used.

Next, the ceramic dried body filled with the plug material paste is subject to degreasing (e.g. at a temperature of at least about 200° C. and at most about 500° C.) and firing (e.g. at a temperature of at least about 1400° C. and at most about 2300° C.) processes under predetermined conditions, so that a honeycomb unit 50, made of a porous ceramic and including a single ceramic sintered body as a whole, is manufactured. Here, with respect to the degreasing and firing conditions and the like of the ceramic dried body, it is possible to apply conditions that have been conventionally used for manufacturing a honeycomb unit made of a porous ceramic. Next, an adhesive paste, which is to be the adhesive layer 41, is uniformly applied to a side face of the honeycomb unit 50 to form an adhesive paste layer thereon, and another honeycomb unit 50 is successively laminated on this adhesive paste layer. By repeating these processes, an aggregate of the honeycomb units of a predetermined size is manufactured.

Since the material forming the adhesive paste has already been described, the description thereof is omitted here.

The honeycomb unit aggregate is then heated so that the adhesive paste layer is dried and solidified to form the adhesive layer 41.

Thereafter, a cutting process is carried out on the honeycomb unit aggregate that a plurality of honeycomb units 50 are bound together by interposing the adhesive layer 41, by using a diamond cutter or the like to form a round pillar-shaped ceramic block.

Then, the sealing material layer (coat layer) 42 is formed on the periphery of the ceramic block by using the sealing material paste, so as to be able to manufacture a honeycomb structure 45, having the sealing material layer (coat layer) 42 formed on the periphery of the round pillar-shaped ceramic block in which a plurality of honeycomb units 50 are bound together by interposing the adhesive layer 41.

Thereafter, oxide catalyst particles are supported on the honeycomb structure 45 so that a catalyst supporting honeycomb 40 is manufactured.

First, a solution of a precursor of a catalyst is prepared. Preferable examples of the precursor of the catalyst include those that become any of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $AnB1-nCO_3$ (in which A represents La, Nd, Sm, Eu, Gd or Y; B represents an alkali metal or an alkali earth metal; and C represents Mn, Co, Fe or Ni), after such precursors are condensed, thermally decomposed, and crystallized in the later process. One kind of these precursors may be used, or two or more kinds thereof may be used in combination. More specifically, for example, nitrate salt, carbonate salt, acetate salt and the like containing a metal element of the oxide can be used, and the examples thereof include a metal complex body represented by a general formula $M(OR1)_p(R2COCHCOR3)_q$ (in the formula, M represents one member selected from the group consisting of Ce, Zr, Fe, Cu, Mn and K; p and q each represents an integer number determined so that the metal complex has a 2 to 8 coordinate structure, and either p or q may be 0; when the number of each of R1, R2 and R3 is two or more, then R1, R2, R3 may be respectively the same or different. R1 and R2 each represents an alkyl group having 1 to 6 carbon atoms, and R3 represents an alkyl group having 1 to 6 carbon atoms and/or an alkoxy group having 1 to 16 carbon atoms), and the like. Examples of solvent include water, an organic solvent such as toluene and alcohol, and the like.

The above-mentioned solution is dispersed in a gas by a known spraying method and the like. When the dispersion is carried out in such a manner that the dispersed droplets have a constant size, then the particle diameter of the oxide catalyst particles to be supported on the honeycomb structure 45 in a later process can be adjusted to a constant size.

Next, the gas including the dispersed solution of the precursor is transported by a carrier gas to flow into one of the ends of the honeycomb structure 45. At this time, the influx speed of the carrier gas is preferably almost the same as the speed of actual exhaust gases from an engine and may be, for example, about 72000 (l/h) in terms of space velocity. The carrier gas is flowed into one of the ends of the honeycomb structure and flowed out from the adjacent cell after passing through a cell wall (see the arrows in FIG. 3B). On this occasion, the solution of the precursor dispersed and mixed in the carrier gas is adhered to the cell walls 53 of the honeycomb structure 45. Further, by heating the honeycomb structure at a temperature of at least about 300° C. and at most about 800° C., the precursor of the catalyst attached to the cell walls 53 is condensed, thermally decomposed and crystallized, and is supported on the honeycomb structure as an oxide catalyst.

The oxide catalyst is supported preferably in such a manner that the carrier gas is flowed into the honeycomb structure 45 while the honeycomb structure 45 is heated so that adhesion of the solution of the precursor as well as condensation, thermal decomposition and crystallization of the precursor are performed simultaneously. With this arrangement, the precursor of the catalyst is adhered to the honeycomb structure 45 as catalyst particles, and thus tends to be more evenly supported.

Here, the honeycomb structure 45 may be an integral honeycomb structure including a single honeycomb unit. Upon manufacturing such an integral honeycomb structure, an integral honeycomb structure can be formed by using the same method as the above-described method of manufacturing the honeycomb unit, except that the size of a honeycomb molded body to be molded through the extrusion-molding process is larger than in a case where the honeycomb unit is manufactured and that the shape of a honeycomb molded body to be molded through the extrusion-molding process is different from in a case where the honeycomb unit is manufactured. Further, with respect to a main constituent material of the integral honeycomb structure, cordierite and aluminum titanate, which are superior in thermal impact resistance, are desirably used.

For example, FIG. 6 is a cross-sectional view that schematically shows the cross section of an integral catalyst supporting honeycomb according to the present embodiment.

In a honeycomb structure 60 shown in FIG. 6, a quadrangular-shaped small-volume cell 55 is formed at each of portions corresponding to crossing points of grid lines, and each large-volume cell 54 has a quadrangular shape with four corners chipped with small quadrangles, and a cell wall (wall portion) 53 separating these are formed.

EXAMPLE 1

54.6% by weight of coarse powder of silicon carbide having an average particle diameter of 22 μm, 23.4% by weight of fine powder of silicon carbide having an average particle diameter of 0.5 μm, 4.3% by weight of methylcellulose as an organic binder, 2.6% by weight of lubricant (UNILUB, made by NOF Corporation), 1.2% by weight of glycerin, and 13.9% by weight of water were mixed, and then kneaded to prepare a mixture. Then, the mixture was extrusion-molded so that a raw molded body was manufactured. At this time, the shapes of cells in the raw molded body were formed by using a dice that makes an octagonal shape for a cell in the set of large-volume cells in the cross section perpendicular to the longitudinal direction, and a quadrangular shape for a cell in the set of small-volume cells in the cross section perpendicular to the longitudinal direction, as shown in FIG. 3. Further, the ratio of the cross-sectional area of the set of large-volume cells between that of the set of small-volume cells in the cross sections perpendicular to the longitudinal direction, and the ratio of the cross-sectional area of the large-volume cell between that of small-volume cell in the cross sections perpendicular to the longitudinal direction were both set to 2.54.

Next, the raw molded body was dried by using a microwave drying apparatus and the like to form a ceramic dried body, followed by filling of a plug material paste having the same composition as that of the raw molded body into the predetermined cells.

Further, after again dried by a drying apparatus, the resulting product was degreased at 400° C. and then fired at 2200° C. under a normal-pressure argon atmosphere for 3 hours so as to manufacture a honeycomb structure formed by a silicon carbide sintered body with a porosity of cell walls of 42%, an average pore diameter of 11.0 μm, a size of 34 mm×34 mm×150 mm, the number of cells of 45.6 pcs/cm2 (300 cpsi) and a thickness of the cell walls of 0.25 mm.

Next, an oxide catalyst was supported on the obtained honeycomb structure.

First, cerium nitrate was dissolved in water to prepare a solution of a precursor of $CeO_2$. A gas in which the solution of the precursor was dispersed was transported by a carrier gas so as to be flowed into the set of large-volume cells from one of the ends of the honeycomb structure. Here, the speed of the carrier gas was adjusted to a space velocity of 72000 (l/h). In this manner, a catalyst supporting honeycomb in which $CeO_2$ having an average particle diameter of 0.1 μm are supported on the honeycomb structure including silicon carbide sintered body was obtained. Here, the amount of the $CeO_2$ was adjusted to 20 g per 1 L of the catalyst supporting honeycomb. Measurement of the average particle diameter of the oxide catalyst was performed by using SEM photographs.

COMPARATIVE EXAMPLE 1

A honeycomb structure including silicon carbide sintered body was manufactured in the same manner as Example 1. The honeycomb structure was immersed in a solution containing 10 g of $CeO_2$, 40 ml of water and a pH adjusting agent mixed therein for 5 minutes, and a firing treatment was carried out on the resulting honeycomb structure at 500° C. so that a catalyst supporting honeycomb having $CeO_2$ supported thereon was manufactured. Here, the average particle diameter of the supported $CeO_2$ was 2 μm, and the support amount was 20 g/L.

COMPARATIVE EXAMPLE 2

Figure 7:
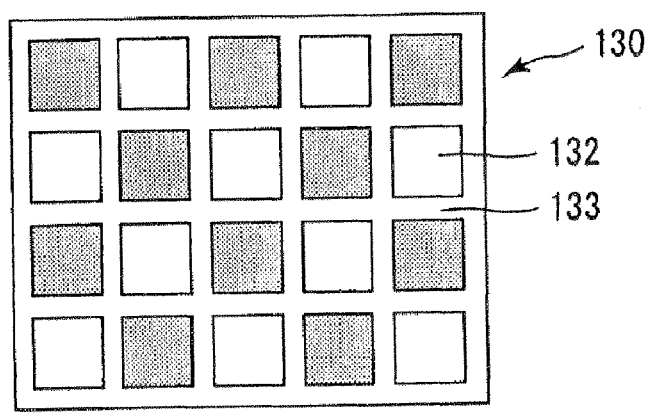
FIG. 7 is a diagram of a cross section perpendicular to the longitudinal direction of a cell in a conventional catalyst supporting honeycomb unit.

A catalyst supporting honeycomb was manufactured by the same method as in Example 1 except that the cross-sectional shape of every cell was set to a square, as shown in FIG. 7.

COMPARATIVE EXAMPLE 3

A catalyst supporting honeycomb was manufactured by the same method as in Comparative Example 1 except that the cross-sectional shape of every cell was set to a square, as shown in FIG. 7.

COMPARATIVE EXAMPLE 4

The honeycomb structure obtained in Example 1 was used as the sample in Comparative Example 4 (no catalyst is supported).

COMPARATIVE EXAMPLE 5

The honeycomb structure obtained in Comparative Example 2 was used as the sample in Comparative Example 5 (no catalyst is supported).

(Evaluation Method)

Figure 8:
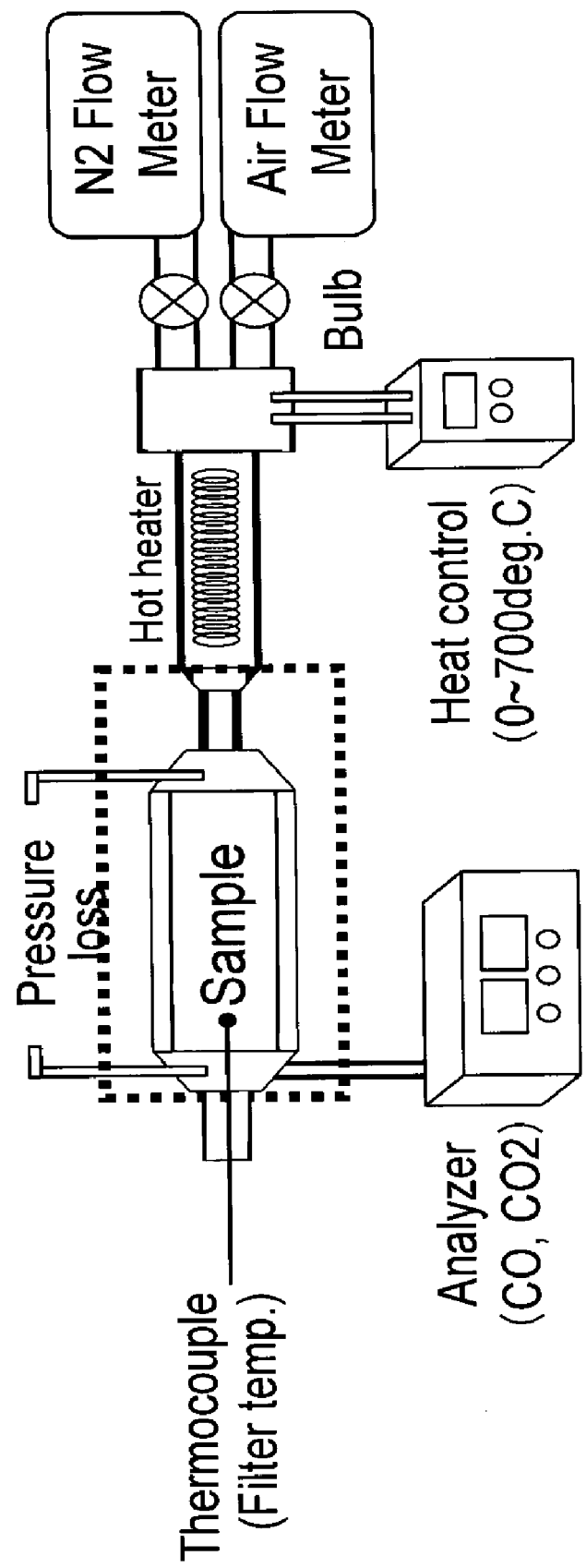
FIG. 8 is a diagram of a soot oxidation rate evaluation device.
Figure 9:
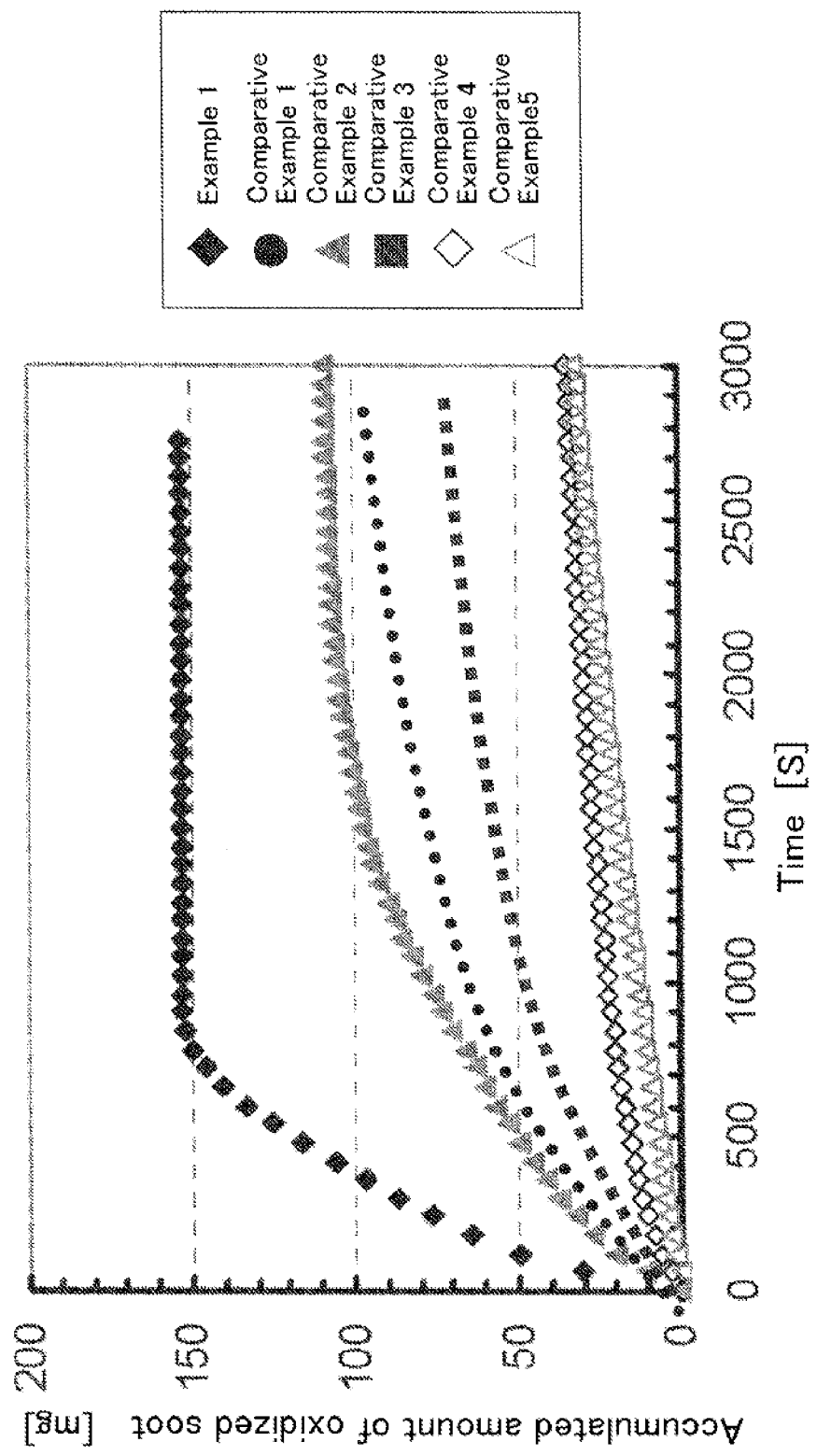
FIG. 9 is a graph that shows the change in an amount of oxidized soot accumulated with time in a catalyst supporting honeycomb.

By using a soot generating device CAST2 manufactured by Matter Engineering AG, 2.0 g/L of soot having an average particle diameter of 82 μm was captured with each of the catalyst supporting honeycombs and samples obtained in Example 1 and Comparative Examples 1 to 5, at a flow rate of 30 L/min. Next, the catalyst supporting honeycomb having the soot accumulated therein is set in the soot oxidization rate evaluation device of FIG. 8, and the influx gas temperature is adjusted so that the temperature of the portion that is 15 mm inward from the entry of the sample becomes 560° C. while introducing only a nitrogen gas. After having kept the stable state for 10 minutes, the bulb was switched and 10% of oxygen was introduced into the catalyst supporting honeycomb at a space velocity of 72000 (l/h) to combust the soot. The concentration of the carbon monoxide and the carbon dioxide generated at the time of combustion was calculated with the $CO/CO_2$ Analyzer manufactured by Shimadzu Corp., and these were presumed to be the ideal gas to calculate the weight of oxidized soot, so that the soot oxidation rate was obtained. The result is shown in FIG. 9 as the change in the amount of oxidized soot accumulated with time per unit time.

EXAMPLE 2

Next, by using a heat resistant adhesive paste containing 30% by weight of alumina fibers having an average fiber length of 20 µm, 21% by weight of silicon carbide particles having an average particle diameter of 0.6 µm, 15% by weight of silica sol, 5.6% by weight of carboxymethyl cellulose and 28.4% by weight of water, a large number of honeycomb structures (honeycomb units) obtained in Example 1 were combined with each other, and after being dried at 120° C., this was cut by using a diamond cutter to form a round pillar-shaped ceramic block with the thickness of the sealing material layer of 1 mm. Thereafter, by using a sealing material paste (coat layer paste) containing 23.3% by weight of silica-alumina fibers having an average fiber length of 100 µm and an average fiber diameter of 10 µm, 30.2% by weight of silicon carbide powders having an average particle diameter of 0.3 µm, 7% by weight of silica sol, 0.5% by weight of carboxymethyl cellulose and 39% by weight of water, a sealing material layer having a thickness of 0.2 mm was formed on the peripheral portion of the ceramic block, and this was dried at 120° C. to obtain a round pillar-shaped honeycomb structure having a size of φ143.8 mm×150 mm.

Next, an oxide catalyst was supported on the honeycomb structure in the same manner as in Example 1. Here, the average particle diameter of CeO2 was 0.1 µm, and the support amount was 20 g/L.

COMPARATIVE EXAMPLE 6

The round pillar-shaped honeycomb structure obtained in Example 2 was used as the sample in Comparative Example 6 (no catalyst is supported).

COMPARATIVE EXAMPLE 7

By using the honeycomb structure (honeycomb unit) obtained in Comparative Example 2 and the adhesive paste and the sealing material paste (coat layer paste) used in Example 2, a round pillar-shaped honeycomb structure having a size of φ143.8 mm×150 mm was similarly obtained.

Next, an oxide catalyst was supported on the honeycomb structure in the same manner as in Example 1. Here, the average particle diameter of CeO2 was 0.1 µm, and the support amount was 20 g/L.

COMPARATIVE EXAMPLE 8

The honeycomb structure obtained in Comparative Example 7 was used as the sample in Comparative Example 8 (no catalyst is supported).

(Evaluation Method)

Figure 10:
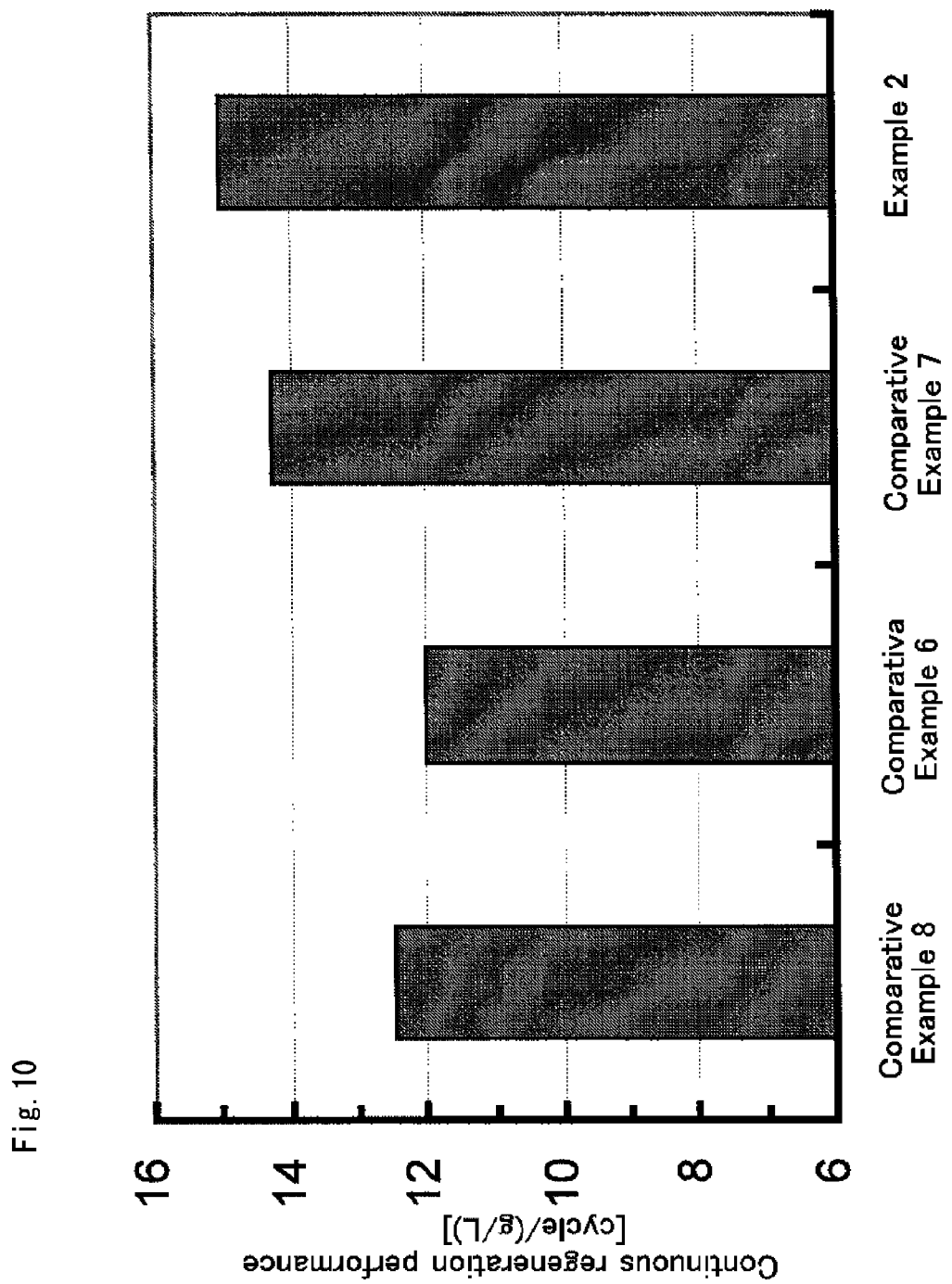
FIG. 10 is a graph that shows a continuous regeneration performance of a catalyst supporting honeycomb.

On the pathway of exhaust gases discharged from a 2 L common rail engine, catalyst supporting honeycombs and samples obtained in Example 2 and Comparative Examples 6 to 8 were mounted at the position 0.6 m away from the turbo charger of the engine, after having pre-measured the initial weight. Then, the engine was driven in NEDC mode for 30 cycles continuously, and by measuring the weight of the filters (the catalyst supporting honeycombs and samples) again, the amount of soot accumulated in the catalyst supporting honeycombs and samples during the 30 cycles. The obtained results are shown in FIG. 10 with the index of continuous regeneration performance. This index of continuous regeneration performance is defined as the number of cycles by the time 1.0 g/L of soot accumulates in a catalyst supporting honeycomb.

The results in FIG. 9 (Example 1 and Comparative Examples 1 to 5) indicate that the active points of catalysts and soot increases and the oxidization rate of soot can be improved exponentially, by providing the set of large-volume cells and the set of small-volume cells and supporting 0.05 to 1 µm of oxide catalysts on the cell walls. Further, the results in FIG. 10 (Example 2 and Comparative Examples 6 to 8) indicate that the continuous regeneration performance is improved and the amount of soot that accumulates with time on the cell walls can be kept small, by providing the set of large-volume cells and the set of small-volume cells and supporting 0.05 to 1 µm of oxide catalysts on the cell walls.

Figure 11A:
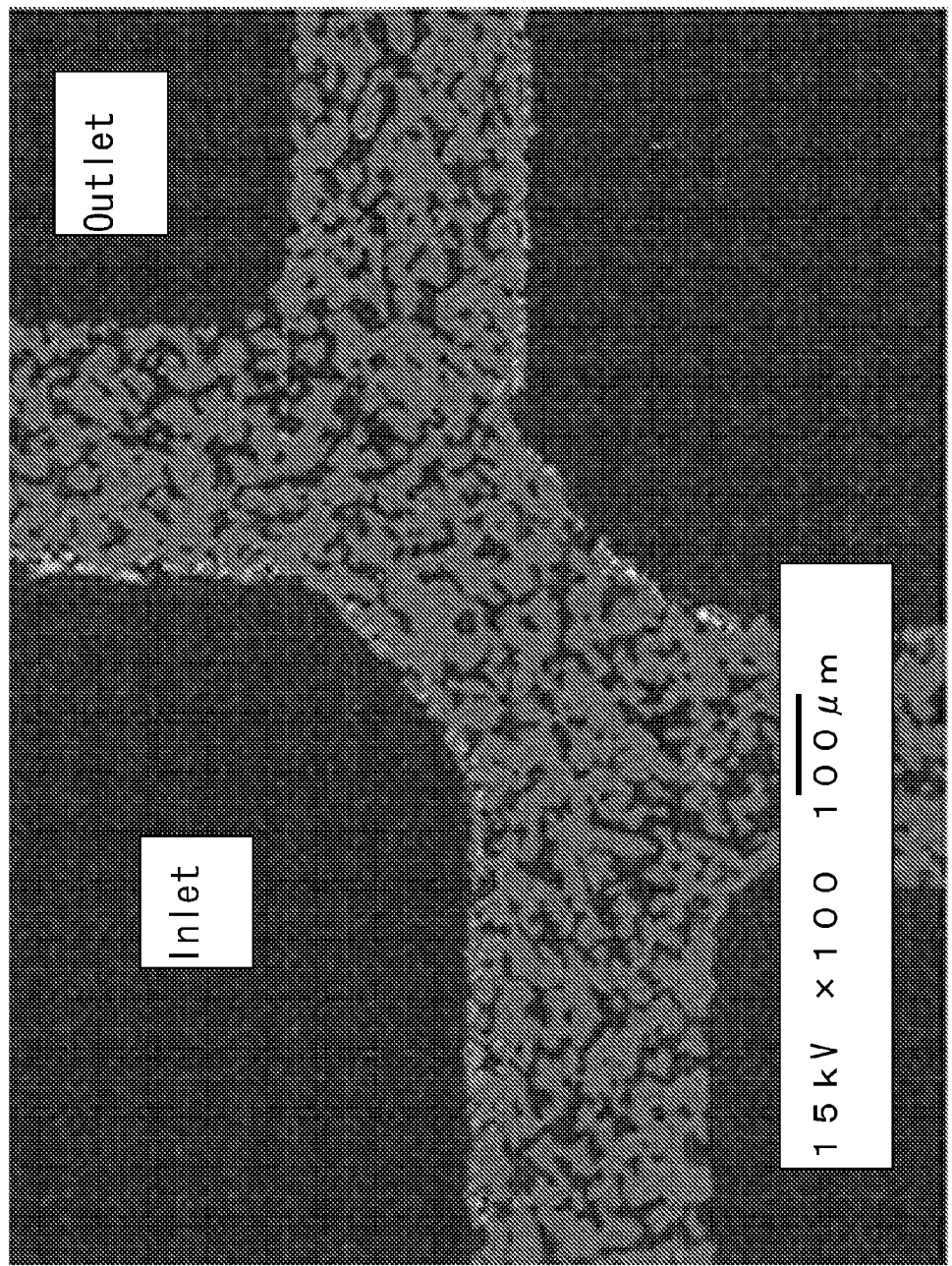
FIGS. 11A to 11C are views that illustrate a cross-sectional SEM image of a cell wall of a catalyst supporting honeycomb in Example 1.
Figure 11B:
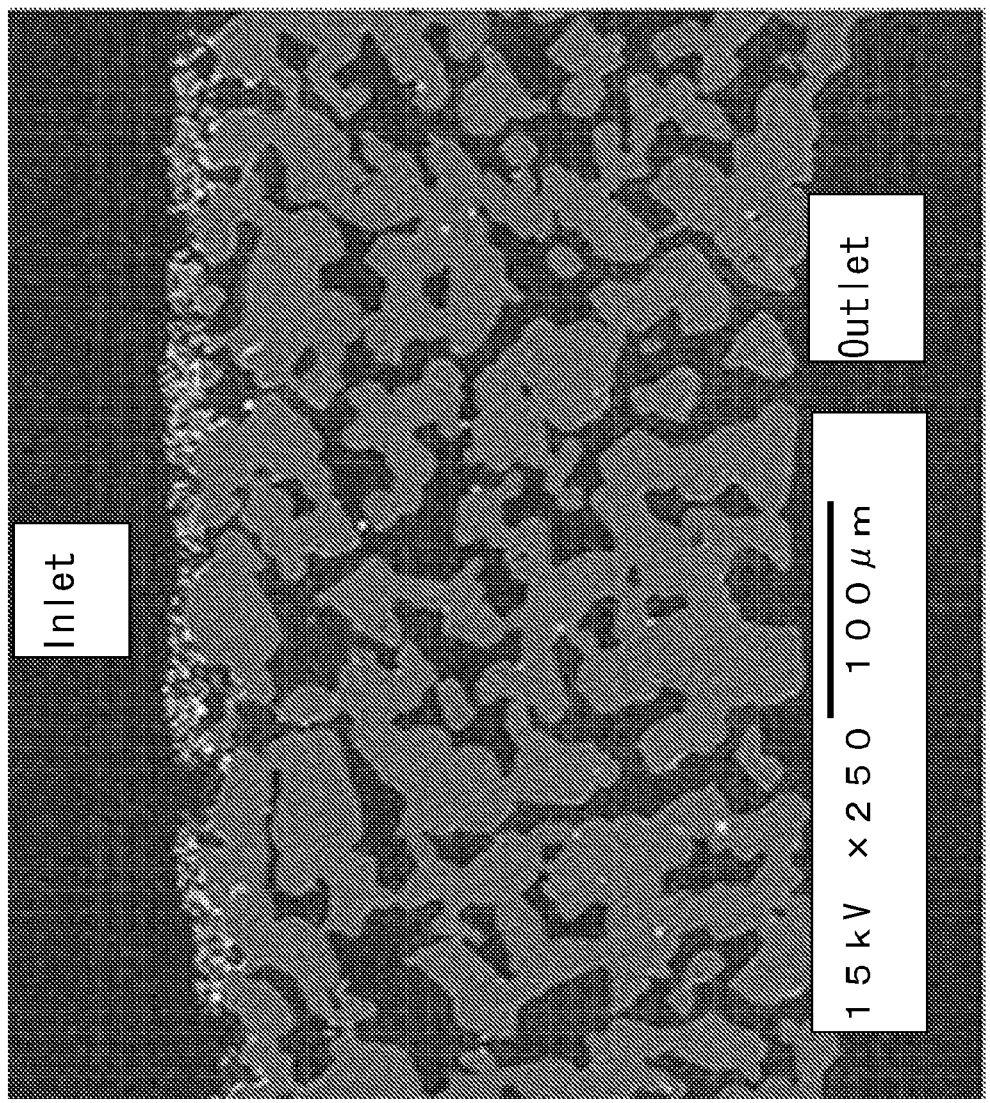
Figure 11C:
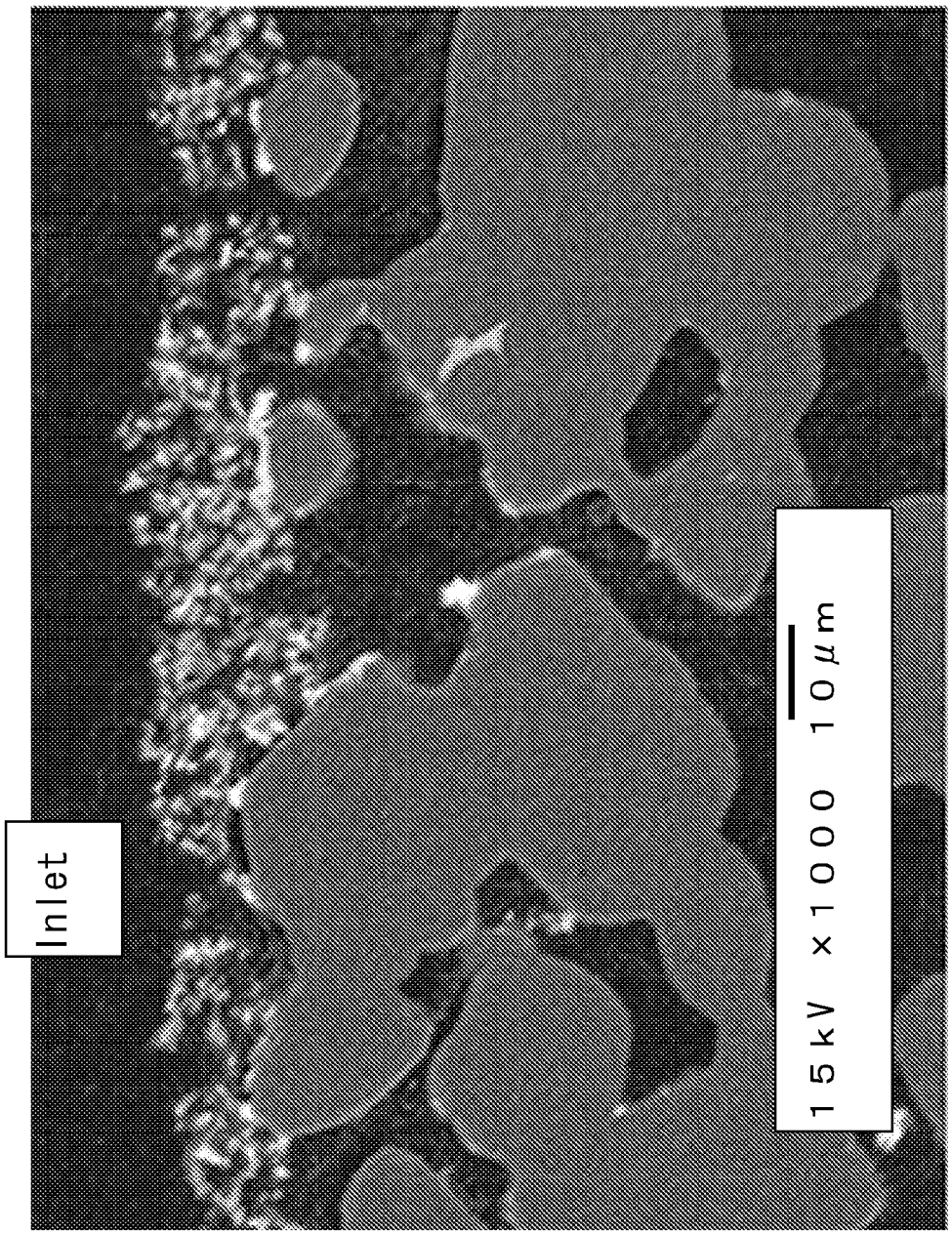

FIGS. 11A to 11C are photographs that show the cross section of a cell wall of the catalyst supporting honeycomb in Example 1 observed by SEM. It shows the oxide catalysts supported on the surface of the cell walls in a cake state.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a catalyst supporting honeycomb, the method comprising:
   manufacturing a honeycomb structure comprising cell walls extending in a longitudinal direction of the honeycomb structure to define a plurality of cells extending in the longitudinal direction, said plurality of cells comprising:
   large-volume cells having first opening ends and second closing ends opposite to the first opening ends along the longitudinal direction; and
   small-volume cells having first closed ends and second opening ends opposite to the first closed ends along the longitudinal direction, total cross sectional areas of the large-volume cells on a plane perpendicular to the longitudinal direction being larger than total cross sectional areas of the small-volume cells on the plane, the first opening ends of the large-volume cells being located on the same side as the first closed ends of the small-volume cells, and the second closing ends of the large-volume cells being located on the same side as the second opening ends of the small-volume cells;
   dispersing a solution of a precursor of oxide catalyst particles in a gas, the oxide catalyst particles serving for improving a combustion behavior of soot in exhaust gases; and
   introducing the gas containing the dispersed solution of the precursor of the oxide catalyst particles into said honeycomb structure;
   so that the precursor of the oxide catalyst particles is formed into oxide catalyst particles having an average particle diameter of at least about 0.05 µm and at most about 1.00 µm.

2. The method of manufacturing a catalyst supporting honeycomb according to claim 1, wherein each of the large-volume cells has an octagonal cross sectional shape on the plane and wherein each of the small-volume cells has a quadrangular cross sectional shape on the plane.

3. The method of manufacturing a catalyst supporting honeycomb according to claim 1, wherein said honeycomb structure comprises a ceramic sintered body.

4. The method of manufacturing a catalyst supporting honeycomb according to claim 3, wherein said honeycomb structure comprises a silicon carbide sintered body.

5. The method of manufacturing a catalyst supporting honeycomb according to claim 1, wherein said honeycomb structure comprises a plurality of honeycomb units connected to each other.

6. The method of manufacturing a catalyst supporting honeycomb according to claim 1, wherein said oxide catalyst comprises at least one of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $A_nB_{1-n}CO_3$, in which A represents La, Nd, Sm, Eu, Gd or Y, B represents an alkali metal or an alkali earth metal, and C represents Mn, Co, Fe or Ni.

* * * * *

UNITED STATES PATENT AND TRADEMARK OFFICE
CERTIFICATE OF CORRECTION

| | | |
|---|---|---|
| PATENT NO. | : 7,867,944 B2 | |
| APPLICATION NO. | : 12/104296 | |
| DATED | : January 11, 2011 | |
| INVENTOR(S) | : Athanasios G. Konstandopoulos et al. | |

It is certified that error appears in the above-identified patent and that said Letters Patent is hereby corrected as shown below:

Column 14, Line 58, the line should read as follows:
comb structure so that the precursor of the oxide catalyst particles is Signed and Sealed this
Third Day of May, 2011

David J. Kappos
*Director of the United States Patent and Trademark Office*